United States Patent [19]

Milewski

[11] 3,931,441

[45] Jan. 6, 1976

[54] FIBER-SPHERE ARTICLE OF MANUFACTURE

[75] Inventor: John Vincent Milewski, Somerville, N.J.

[73] Assignee: Exxon Research and Engineering Company, Linden, N.J.

[22] Filed: Sept. 14, 1973

[21] Appl. No.: 397,225

[52] U.S. Cl. ............... 428/283; 428/290; 428/406; 252/477 R
[51] Int. Cl.² ............................................ B32B 5/16
[58] Field of Search ............ 252/477 R; 161/DIG. 5; 428/283, 290, 406

[56] References Cited
UNITED STATES PATENTS

| | | | |
|---|---|---|---|
| 2,431,143 | 11/1947 | Schutte | 252/477 R |
| 3,024,206 | 3/1962 | Duke | 252/477 R |
| 3,242,101 | 3/1966 | Erickson et al. | 252/477 R |
| 3,316,139 | 4/1967 | Alford et al. | 161/DIG. 5 |
| 3,560,408 | 2/1971 | Kiehl et al. | 252/477 R |
| 3,632,709 | 1/1972 | Hayes et al. | 252/477 R |
| 3,697,447 | 10/1972 | Bettinardi | 252/477 R |
| 3,769,126 | 10/1973 | Kolek | 161/DIG. 5 |

*Primary Examiner*—W. J. Shine

[57] ABSTRACT

This invention relates to an article of manufacture comprising a mixture of fiber and sphere materials in substantially optimum packing condition between said materials, each of said materials being present in selected fractional loadings in said mixture, said fibers having a definite length to diameter ratio and said spheres having a selected diameter predetermined in relation to its loading in the mixture and the ratio of its diameter to the diameter of the fibers for said given length to diameter ratio of said fibers thereby to provide an efficient packing condition in said article.

5 Claims, 10 Drawing Figures

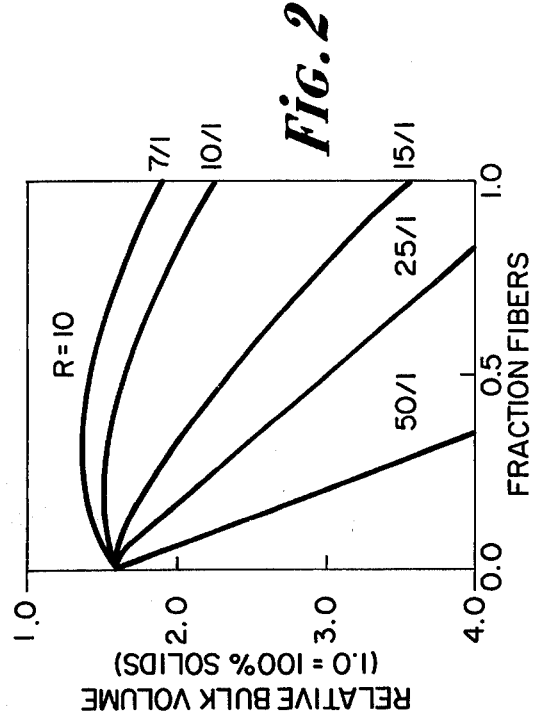
Fig. 2
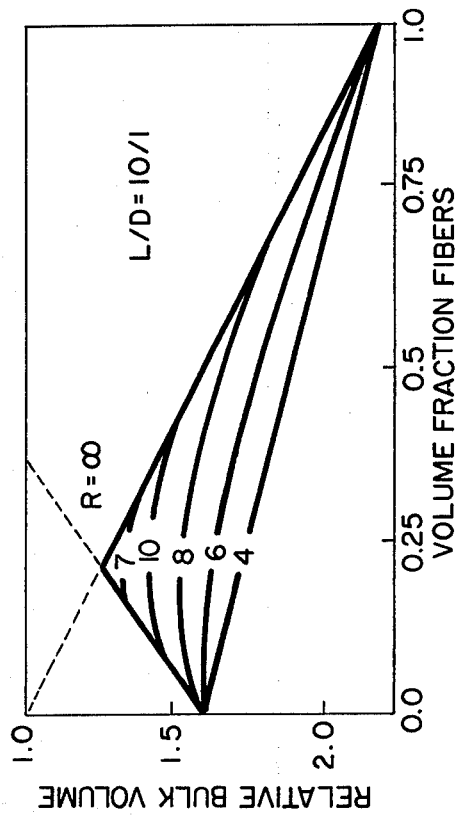
Fig. 1
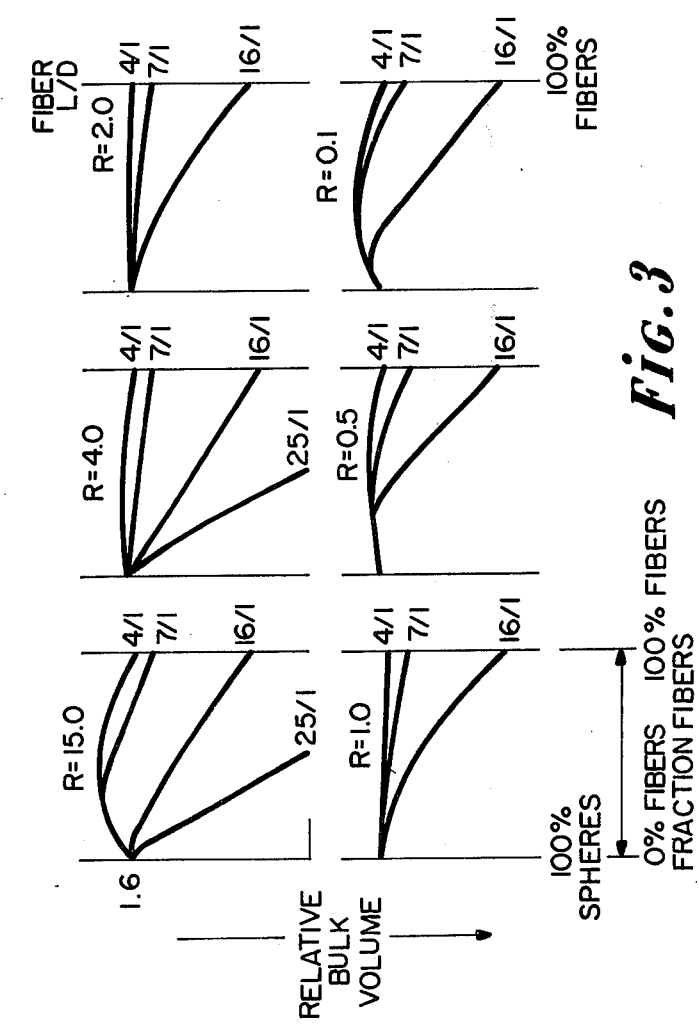
Fig. 3
Fig. 4

FIBER-SPHERE ARTICLE OF MANUFACTURE

This invention relates to fiber-sphere articles of manufacture, such as reinforced articles, and more particularly it is concerned with articles of fibers and spheres uniquely packed together. In a preferred form of the invention, fiber glass reinforced articles are packed advantageously and efficiently with glass bead spheres. In another form of the invention, novel reinforced plastic composite articles are provided by compacting a resin matrix with a reinforcing mixture comprising fibers packed with spherical beads, each component being present in predetermined geometrical relationships and in compositional limits with respect to each other.

Several investigators have noted that the addition of glass beads to various forms of fiber glass reinforced plastics can improve the physical properties of the fiber glass reinforced plastics as well as reduce the cost of the fiber glass reinforced articles. However, none have determined that a synergistic effect is present between the components sufficient to establish a packing parameter in the system whose control would optimize performance of the system, including flow and mechanical properties. Such control is intended to provide improved reinforced articles of fiber material admixed with spherical material, such as fiber glass in combination with glass beads. In a resin matrix, such systems are particularly advantageous as reinforced plastic molding or casting compounds where a major benefit is optimization of the amount of resin to produce a workable, moldable, or castable material.

The amount of resin required in such systems can be reduced, if desired, by maximizing the packing of the reinforced fibers and spheres.

In other applications, as for example, fluid bed catalysts, an open fiber-sphere structure is desired and therefore the packing condition is set at a minimum.

In accordance with the present invention, novel fiber-sphere compositions and articles of manufacture are provided in which the geometrical and compositional parameters in the system are selected to produce articles having more useful properties for commercial applications. More particularly, what is described herein are fiber-sphere compositions which are particularly advantageous for use in many industrial products where the degree of packing is important. These products include fluid bed catalysts used in the chemical petroleum industries, high-strength reinforcement articles having wide applicability in the aircraft industry, in plastic molding compositions, and in many commercial casting applications where high strength and high modulus are required properties of the product.

Accordingly, it is an object of the present invention to provide an article of manufacture comprising a fiber material compacted with a spherical material approaching a predetermined void content in the resulting system.

Another object of this invention is to provide a composite of fiber glass and beads approaching maximum or minimum packing density.

Still another object of this invention is to provide a reinforced plastic molding composition comprising a mixture of fiber material and spherical material in a resin matrix in which the resin content is minimized while maintaining the strength of the composition at a maximum.

A further object of this invention is to provide discontinuous fiber reinforced material having a minimum void condition by maximumization of packing density.

Another specific object herein is to provide a fiber-sphere-resin reinforced molding or casting composition.

Another object of this invention is the provision of a fiber-sphere article of manufacture approaching a predetermined packing of spheres into fibers and viceversa for fibers of given length to diameter ratio into spheres of predetermined diameter.

Another object of this invention is the provision of a reinforced plastic composition having a minimum or maximum resin content of the composition as desired for the same amount of fibers and spheres.

Yet another object of the invention is the provision of articles of manufacture having a fiber-sphere combination for a specific fiber loading having a predetermined length to diameter of the fibers, in which the ratio of the sphere diameter to the diameter of the fiber is present at very large values or at very small values to achieve said maximum packing in said article.

Among the other objects of the invention, is the provision of a reinforced plastic composition comprising fiber glass and glass beads in a resin matrix having a predetermined bead size in relation to the length to diameter ratio of the fibers thereby to provide a predetermined void content in the system either minumum or maximum, and thereby to optimize the resin content necessary to fill the voids in the composition.

Another object of this invention is the provision of articles of manufacture comprising fibersphere combinations having a maximum packing efficiency in which the ratio of the diameter of the spheres to that of the fibers is made either very large or very small in magnitude for fibers of predetermined length to diameter ratios.

A specific object herein is to provide an improved fiber-sphere fluid catalyst bed article of manufacture having a porous, open structure.

Symbols and Definitions $R$ = The ratio of the diameter of the sphere to the diameter of the fiber.

$L/D$ = The ratio of the length to diameter of the fiber.

$V$ = Relative bulk volume, the ratio of the actual volume occupied by a bed of particles to the volume it would occupy if it had nil voids (100% solids).

$v$ = Packing volume (mixture of particles).

The fiber-sphere articles of the invention are characterized by approaching a predetermined, optimized packing condition in which the void content for a given composition of fibers and spheres is varied towards a minimum or maximum condition, as desired, based upon selection of geometry and composition of the fibers and spheres in the composition. Specifically, for fibers in the composition of given length to diameter ratio, $L/D$, and a selected fiber loading, that is, a given fraction of fibers in the fiber-sphere composition, a selected diameter of the spheres — in relation to both said $L/D$ of the fibers and the fiber content of the composition — provides an article approaching a minumum or maximum void content, as desired.

For application as a fluid bed catalyst where maximum open area is preferred, the void content of the fiber-sphere articles is selected to be a maximum, i.e. the packing density of the fibers and spheres is minimized. Similarly, in use as a reinforced plastic article, where the resin may be less expensive than the spheres or fibers themselves, maximum void content or minimum packing also is desirable and the parameters of the mixture thereupon are adjusted to provide articles having these attributes. However, in these compositions where the cost of the resin is higher than the components themselves, the void content of the fiber-sphere mixture is minimized and thus less resin is needed to fill the voids to make a moldable or castable compound. The present invention permits adjustment of the parameters of the product in accordance with these desired different objectives.

In the articles described herein, fibers are defined as elongated particles, either hollow or solid, and spheres are those particles generally round in shape, which also may be either hollow or solid.

In general, the compositional and geometrical makeup of the articles of the invention are determined by first selecting a given length to diameter ratio of the fibers. For a minumum void condition, for example, the L/D ranges from 1 to 100. It is to be understood, however, that the actual numerical values presented herein are given relation to other parameters which form a set of consistent values, and are not to be taken as being absolute values by themselves. Furthermore, they are to be considered as illustrations of the invention and not in any way to be limiting of the invention.

The next step is to select a fiber loading which may be anywhere between 0–100%. Then an R value, the ratio of the diameter of the spheres to that of the fibers, is selected to provide a minimum void condition of the articles, as described further below.

Similarly for articles approaching minimum void condition, or maximum packing, the two independent variables of fiber L/D and fiber loading, will provide the desired article when the dependent variable R, involving the diameter of the spheres in relation to that of the fibers, is selected.

The fiber-sphere articles of the present invention may be provided with a third constituent, if desirable, to produce a useful product for a specific application. Suitable third constituents, or matrix materials, usually are selected from among metals, plastics, ceramics and wood materials, either singly, or in combination, although others may be used as well.

A detailed description of the procedures by which the products of the present invention are made is described in the Ph.D. thesis of the inventor herein, published May, 1973, entitled, "A Study of the Packing of Fibers and Spheres," on file in the Library of the Rutgers University, New Brunswick, N.J. This thesis is hereby incorporated by reference into this application for purposes of providing details of operational procedure and experimental results to augment the present description.

In The Drawings

FIG. 1 is a plot a packing; namely, relative bulk volume vs. volume fraction fibers for mixtures of fiber glass and spherical beads at a constant length of diameter ratio of fibers, L/D, of 10, at various ratios of sphere diameter to fiber diameter, R, to illustrate the effect of R on the packing properties of the articles.

FIGS. 2 and 3 are plots of relative bulk volume vs. fraction fibers for various L/D's of fibers at a constant R, and for different R values.

FIG. 4 is a plot of bulk volume vs. fraction fiber to illustrate the calculation of packing efficiency, defined as the maximum deviation in relative bulk volume from the mixture line H max, divided by the theoretical maximum deviation at $R = \infty$ and $H\infty$.

Figure 8:
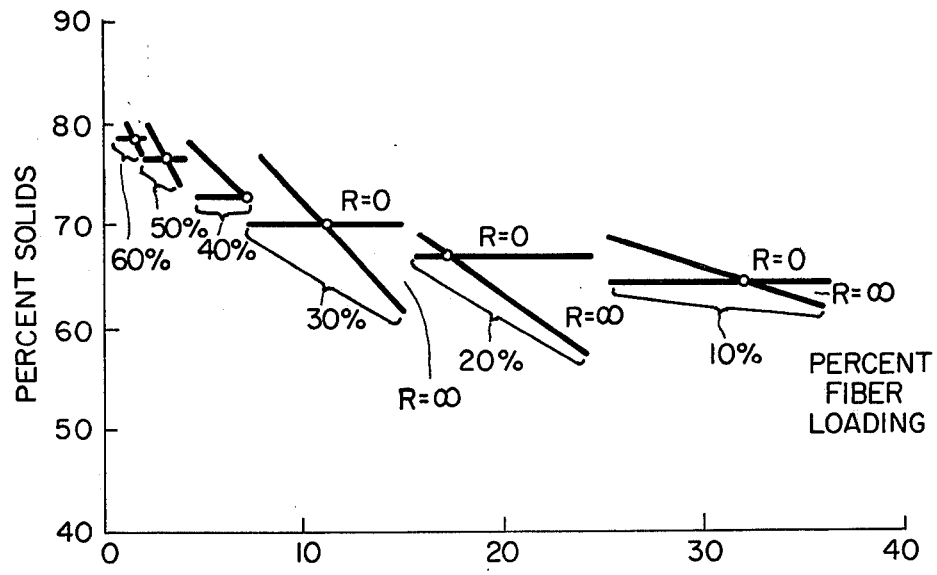

FIG. 8 is a plot of a packing parameter; namely, the solid content of the mixture, vs. L/D at $R=0$ and $R=\infty$ for various % fibers loading. These cross-over points are used to determine the critical L/D at various fiber loadings.

Figure 9:
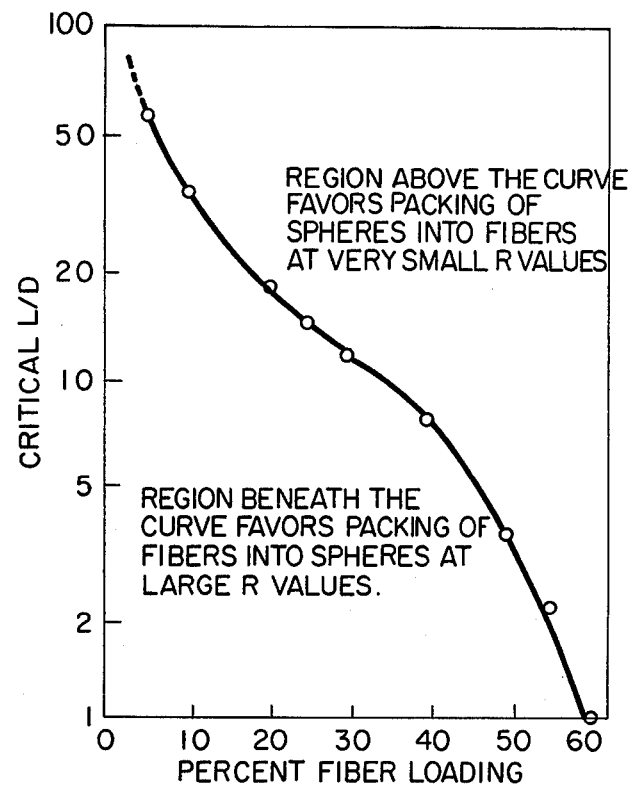

FIG. 9 is a plot of critical L/D vs. fiber loading showing the location of both large or small R values, for example with small R value where the packing of spheres into fibers is favored, and for large R values where the packing of fibers into spheres is favored.

Figure 10:
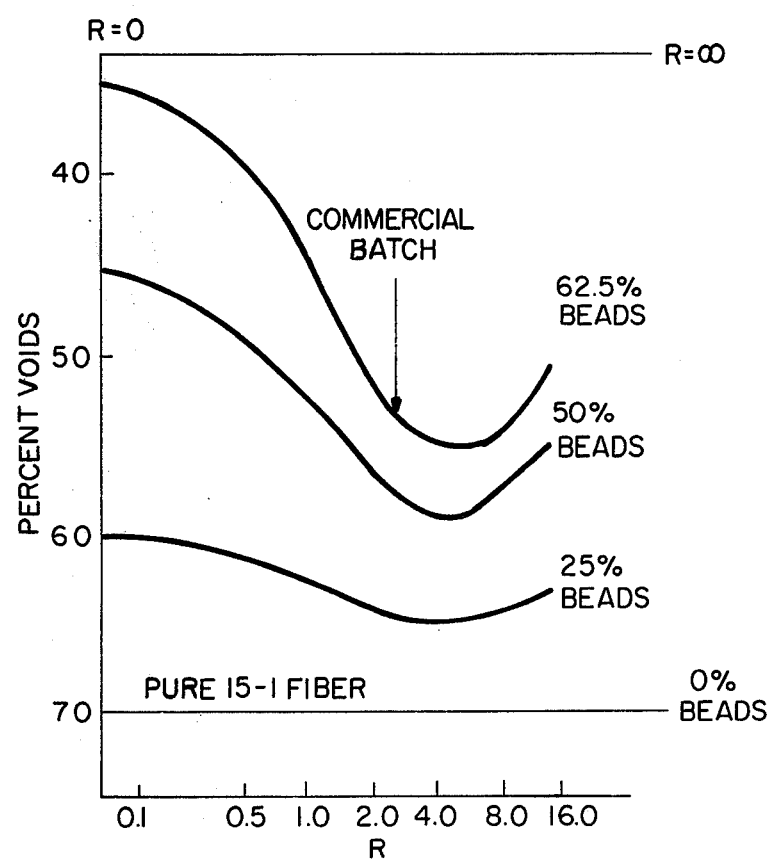

FIG. 10 is a plot of percent voids vs. R for various fiber loading at a constant L/D of 15-illustrates the location of the minimum packing in the system and the direction in which parameter R would be changed to increase packing efficiency and minimize voids.

Referring now particulary to FIG. 1, there is illustrated therein the manner in which the articles of the present invention improve upon the packing characteristics of mixtures of fibers and spheres of various geometries than what would be expected from the normal laws of addition which is a straight line between the packing values or the two end components. In a given mixture including fibers having an L/D of 10 and R value of 4, changes in the volume fraction of fibers in the mixture of fibers and spheres does not result in any incremental change in the packing characteristics over that as would be expected by the low of mixture, as the fraction fibers is changed from 0 to 100% fibers. Thus addition of spheres to fibers merely results in a straight line relationship between sphere packing and fiber packing irrespective of the amount of spheres added. However, as the R value of the spheres is increased from 4 to 70, there is a pronounced curvature to the line bending towards maximized packing, or reduced bulk volume. At about 25% fibers and L/D of 10, maximum packing is achieved as R is increased above 4 towards higher values. The theoretical relative bulk volume of 1.25, i.e. maximum solids, minimum voids, describing maximum packing, is reached at the theoretical R value of infinity.

FIGS. 2 and 3 illustrate a similar effect as described in FIG. 1 at different L/D values. High degrees of curvature illustrate good packing efficiency, as seen at both high and low R values. At intermediate R values, on the other hand, the packing curves become straight. The minimum packing condition, or straight lines, shift toward shorter L/D values as R varies from $R = 4$ to $R = 1.0$.

FIG. 4 is a mathematical definition of a packing efficiency parameter which is based upon the curvature of the lines of FIGS. 2 and 3. The packing efficiency represents the degree to which control of L/D, fractional loading and R values will maximize the packing of fibers and spheres in mixtures of the two.

As is shown in FIGS. 1 - 4, good packing efficiencies are obtained when the short fibers fit easily in between the larger spheres (large R's) producing a net increase in density or decrease in bulk volume as indicated by a large curvature in the line and a relatively high packing efficiency. The curves for the short fibers with medium size spheres R = 1 to 4, follow the law of mixtures closely. These curves show a nearly straight line relationship and have a very low packing efficiency. On the other extremes the packing curves for all fibers have a lot of curvatures and good packing efficiency when the spheres are small, e.g. R = 0.1.

Figure 5:
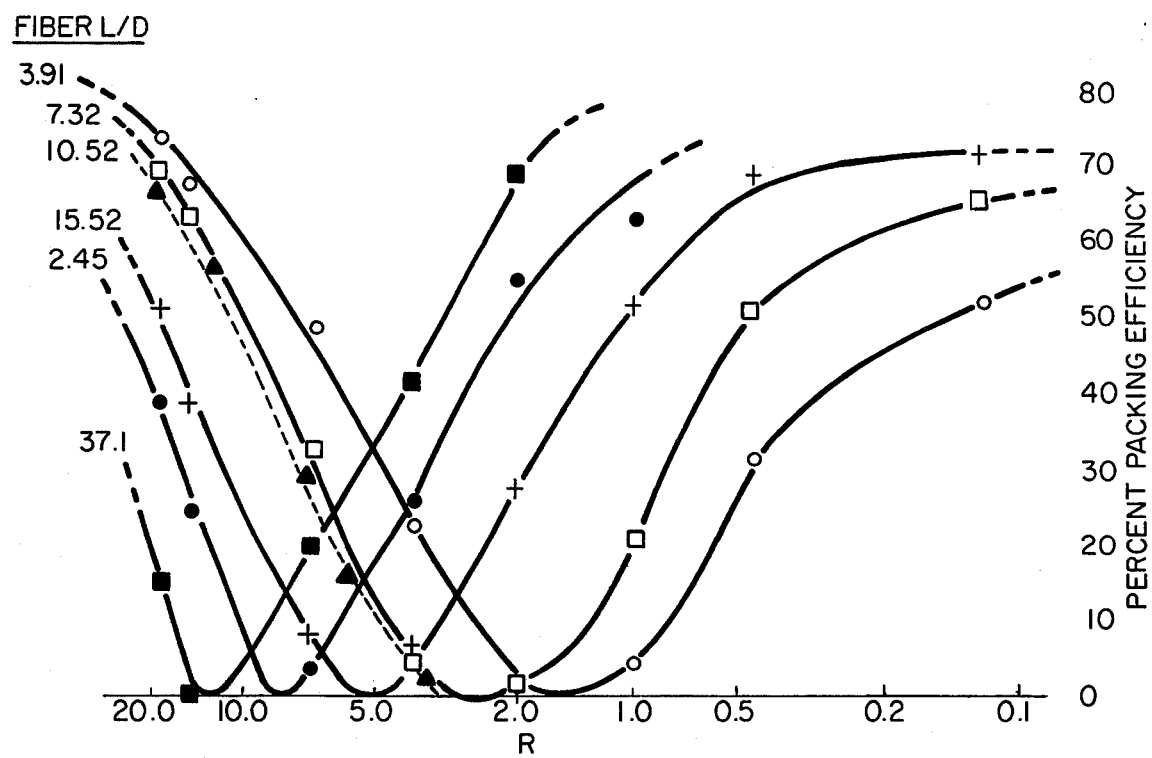
FIG. 5 is a plot of percent packing efficiency vs. R at various L/D's to illustrate the location of a minimum packing condition or maximum void condition in the mixtures.

In a given mixture there is a certain R value for given L/D value, independent of fiber loading, which in fact produces a minimum packing efficiency. A plot of such packing efficiencies vs. R for various L/D values is shown in FIG. 5. The minimum packing efficiencies shown therein thus enable the provision of fiber-sphere articles which have a large amount of voids as fibers and spheres are admixed. In fact, an open fluid bed catalyst can be provided using the data in FIG. 19 in which the number of voids in the catalyst is maximized. For example, at an L/D of 15.52, zero packing efficiency is obtained at an R value of 5.0 even when the fraction fibers is varied from 0 to 100%.

On the other hand, the packing efficiency can be maximized, i.e. the packing of fibers and spheres approaches a maximum, for predetermined R values relative to L/D values for a prescribed loading of fibers and spheres. For example, at an L/D value of 3.91, an R value of 20 provides nearly 80% packing efficiency.

Figure 6:
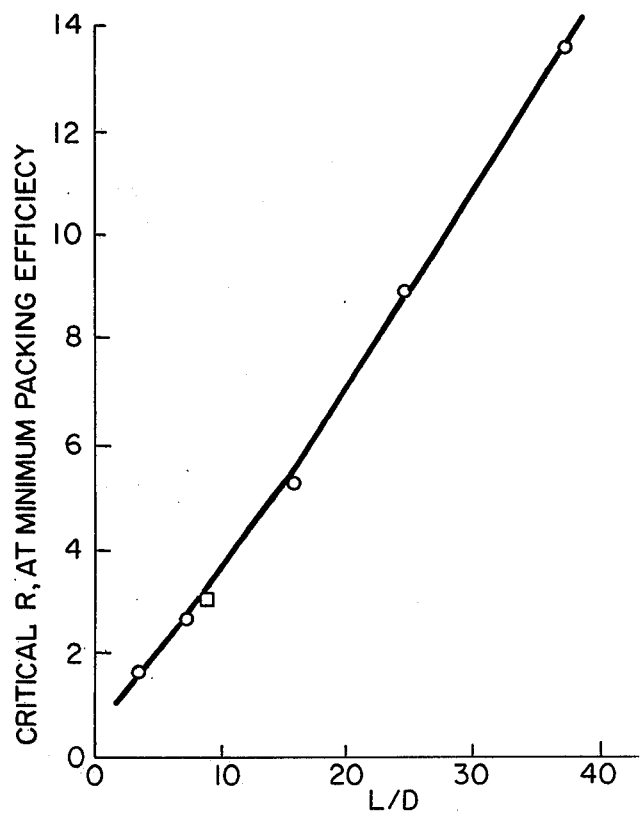
FIG. 6 is a plot of critical R, defined as the R value at minimum packing efficiency vs. L/D at all fiber loadings to illustrate the relationship between the two parameters.

The relationship between R and L/D is nearly a straight line function at the minimum packing efficiency over a wide range of fractional fiber content in the mixture. This relationship is illustrated in FIG. 6. The plot enables one to immediately, determine a suitable R for a given size sphere to produce the maximum open void structure for a fluid bed catalyst. For example, by pre-selection of the L/D values of the fibers the R at maximum voids can be determined from FIG. 6 now for maximum packing conditions the critical L/D parameter is necessary.

The theoretical maximum packing efficiencies of the articles of the invention are calculated graphically from the relative bulk volume data for the sphere and fiber mixtures at different L/D's of the fibers. The experimental maximum densities are read from the data points of the FIG. 3 packing curves for various R's and L/D's at 25, 50, and 75% fiber loading and this data is given in Table I.

Figure 7:
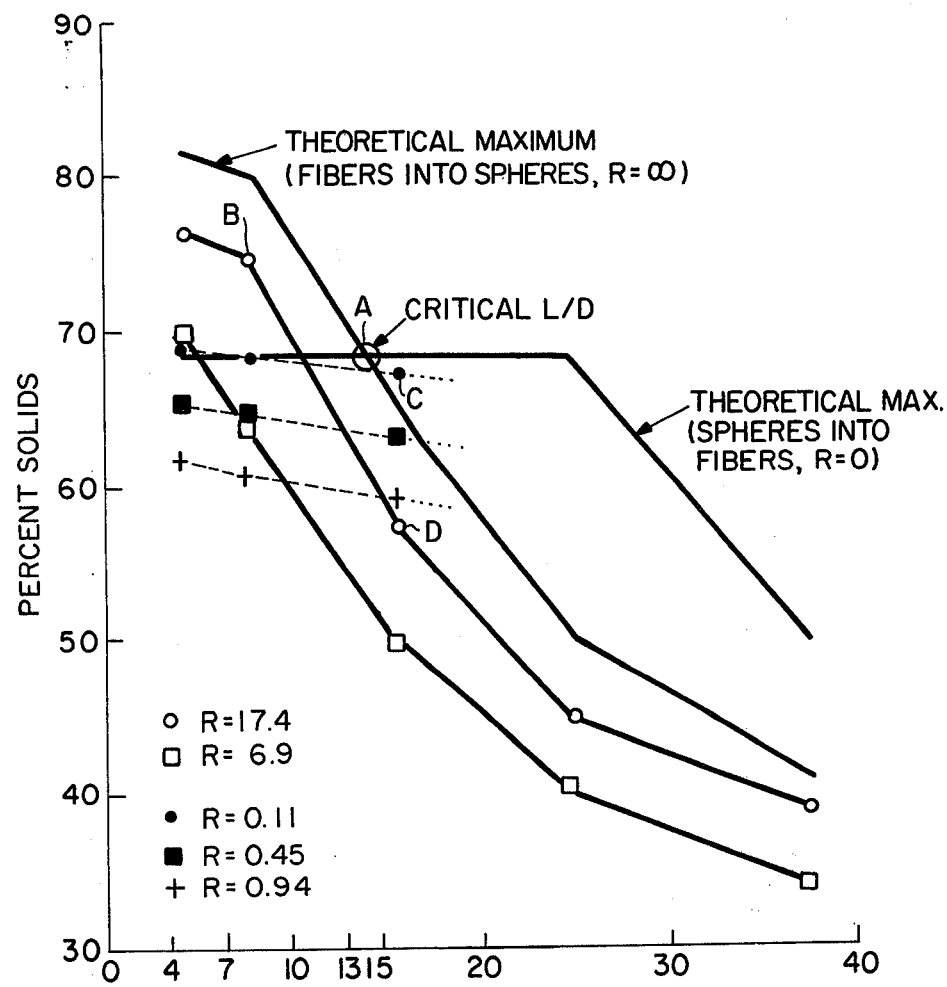
FIG. 7 is a plot of the theoretical percent solids vs. L/D at R values varying from 0 and $\infty$ with experimental data points at intermediate R values varying from 0.11 to 17.4 at 25% fiber loading values.

An examination of the data in Table I as shown in FIG. 7 indicates the percent solids of the articles are at the theoretical limits when packing spheres with 25% fiber loading of various L/D's at the different R values. For example, with a fiber L/D of 13/1 it is impossible to pack these fibers with any size spheres to a density greater than 68.5% solids since this is more than the theoretical value. (pt. a) However, 74% solid packing is not only possible but practical and can be obtained when packing fibers with an L/D of 7/1 or less with spheres having an R value of 17.4 or greater. (point b)

These compositions suggest that R values much less than one give higher actual packing densities at intermediate L/D's (greater than the critical L/D) than R values much greater than one. For example, an R of 0.11 will pack to 68% solid with a 15/1 L/D fiber, (point c) while an R of 17.4 will pack to 57.5% solid for the same 15/1 L/D fiber. (point d)

Table I

EXPERIMENTAL SOLID CONTENTS AT 25%, 50%, AND 75% FIBER LOADING FOR FIBER-SPHERE PACKING

| Fiber L/D | Percent Fibers | R Value | | | | | | | | |
|---|---|---|---|---|---|---|---|---|---|---|
| | | 0 | 0.11 | 0.45 | 0.94 | 1.95 | 3.71 | 6.96 | 14.30 | 17.40 | ∞ |
| 3.91 | 25 | 68.5 | 68.5 | 65.4 | 61.7 | 61.0 | 64.5 | 70.0 | 74.6 | 76.4 | 82.0 |
| | 50 | 76.4 | 74.6 | 67.2 | 61.7 | 60.2 | 64.1 | 67.5 | 72.5 | 74.5 | 75.7 |
| | 75 | 78.2 | 69.5 | 64.5 | 61.0 | 59.5 | 62.5 | 64.2 | 66.7 | 67.2 | 67.1 |
| 7.31 | 25 | 68.5 | 68.5 | 64.5 | 61.0 | 58.5 | 59.9 | 64.5 | 73.5 | 74.6 | 80.6 |
| | 50 | 76.4 | 71.4 | 67.5 | 58.8 | 55.5 | 56.6 | 58.8 | 65.4 | 67.1 | 67.1 |
| | 75 | 66.3 | 61.7 | 60.0 | 55.0 | 52.8 | 53.5 | 54.6 | 57.2 | 58.2 | 57.4 |
| 15.52 | 25 | 68.5 | 66.7 | 63.7 | 59.9 | 54.6 | 50.3 | 50.5 | 54.1 | 57.5 | 65.0 |
| | 50 | 61.7 | 55.6 | 51.8 | 50.7 | 45.5 | 42.0 | 42.4 | 44.3 | 44.3 | 48.1 |
| | 75 | 41.0 | 40.4 | 37.9 | 38.2 | 37.3 | 35.7 | 36.5 | 36.0 | 36.8 | 38.2 |
| 24.50 | 25 | 68.5 | — | — | — | 47.5 | 45.5 | 40.2 | 42.7 | 44.7 | 50.5 |
| | 50 | 40.0 | — | — | — | — | 32.7 | 30.3 | 31.8 | 31.8 | 33.5 |
| | 75 | 26.4 | — | — | — | — | 25.2 | 24.3 | 25.0 | 25.6 | 25.2 |
| 37.10 | 25 | 50.0 | — | — | — | 39.4 | 37.7 | 33.8 | 33.1 | 39.2 | 41.3 |
| | 50 | 25.7 | — | — | — | — | — | 22.6 | 22.6 | 22.6 | 25.6 |
| | 75 | — | — | — | — | — | — | — | — | — | — |

The location of the critical L/D is determined by plotting its theoretical packing maxima for R=0 and R=∞ vs. L/D's, at various percentages fiber loading. FIG. 7 locates the critical L/D from the cross-over points theoretical curve for R=0 and R=∞ at 25% volume loading. FIG. 8 locates the critical L/D from the cross-over points of theoretical curves for R=0 and R=∞ at various volume loading of fibers from 10% to 60%. The points at which these two curves cross is defined as the critical L/D.

A relationship between the critical L/D's and percent solids at various volume percent fiber loading is shown in FIG. 9. When packing fibers and spheres, FIG. 23 will determine whether large R's or very small R's should be used if maximum theoretical solid packing is desired and the percent fiber loading and fiber L/D are given. For example, when using a 25% fiber loading with a 30/1 L/D small R's are most efficient.

In selecting optimum packing parameters, look at FIG. 9 to see whether that combination of fiber loading and L/D falls above or below critical L/D curve. If it falls below the curve the region below the curve favors a packing of fibers into spheres at very large R's, where the spheres to use should be large compared to the fibers. If the fiber loading and L/D chosen brings you above the curve, the region above the curve favors a packing of small spheres into large fibers or very small R's. This critical L/D tells one whether large or small R should be used.

To approach maximumization of the packing condition of the fiber-sphere mixture in general, fibers should be chosen L/D ranging from 1/1 to 100/1, and preferably about 1/1 to 50/1, and for fiber loadings between 0–100%, R should be chosen to be either large or small.

To maximize packing efficiency when choosing small R values, they should be less than 5, suitably less than 0.01, but practically about 0.1. If large R values are chosen, then R should be greater than 5, suitably greater than 100, and more practically about 20.

In a typical fiber-sphere article of manufacture in which L/D is 40 or greater, fiber loadings at 10– 100, R is about 0.1.

In a typical fiber-sphere article of manufacture, at large R values, for L/Ds ranging from 2/1 to 19/1 and fiber loadings of 0 to 20%, R is about 20.

In fiber loading greater than 60%, for all L/D values, R should be small, or about 0.1.

For a castable article having an efficient packing condition in which the spheres and fibers provide a closed, substantially low void-filled article the L/Ds should range from about 1/1 to 30/1. The fiber loadings may remain between 0–100%, and R is greater or less than 5.

Where a moldable article is desired, the L/Ds preferably range from 15/1 to 100/1, the fiber loadings from 5 to 75%, and R is less than 5.

Fluid bed catalyst articles of fibers and spheres approaching a minimum packing condition between the two materials so as to provide an open, substantially large void-filled article are made with L/Ds ranging from 3/1 to 45/1, fiber loadings between 0 and 100%, and R from 1–15. Preferably the L/D is selected to be about three times the R value, the minimum packing condition being independent of selected fiber loadings.

FIG. 10 is used in the application of these packing parameters by converting the packing efficiency or relative bulk volume in FIG. 3 to percent voids. This application illustrated in a series of different curves which are represented in FIG. 10. The lower curve of FIG. 10 represents the condition where there are no spheres. For this condition, no matter how R may vary it doesn't affect the packing because there are no spheres; it is a 100% fiber system. In a straight line relationship, which is the exact packing voids of the fibers themselves, a mixture of about 70% voids or 30% solids is represented. When different loadings of spheres are added to those fibers, improved packing results. If small spheres are added, they fall between the fiber voids and in doing so the percentage of voids in the mixture changes. If the spheres are very large, the fibers fit between the spheres and the percent voids will change at some intermediate size sphere no packing advantage is obtained and maximum voids will result. For example, in addition of spheres to the fibers than represent 1 part of spheres and 3 parts of fibers at different R values a second curve is obtained which is marked 25% beads. The percent voids in this mixture will vary as the R value changes. There are two R values in which the void content goes down and one R value at maximum voids which is the lower part of the curve. The minimum voids are at very high R and very low R values. The curves are almost symetrical with R approaching 0 and R approaching infinity.

FIG. 10 illustrates an important use of this packing condition, where the void volume is plotted versus "R" for 15/1 fiber bead mixtures at several levels of spherical bead content. The packed 15/1 fiber, an approximate commercial size, has about 70% void volume. To mold this mixture, sufficient resin must be added to fill the voids between the fibers completely. But it has been found that by adding spherical beads so that the ratio of beads to fiber glass is 2/3, less resin is required. For example, the void content is reduced 17% when beads with an R of 2.5 are added to a commercial 1/32 inch fiber glass. This is shown by the location of the commercial composition in the upper curve of FIG. 10. However, it can be seen that the selection of the particular sphere size used brought nearly the minimum improvement in void volume reduction of that particular level of beads.

If beads one fifth the size are used, "R" would be reduced to about 0.5, yielding a reduction in void content of about 14%, or a further reduction in resin requirement of about 30%, assuming the voids are just filled. A still smaller bead would allow a reduction in the bead content at constant resin loading, increasing the fiber bead ratio which generally increases the strength of the material.

Table II illustrates representative data for various fiber loadings at maximum solid content of various fiber-sphere mixtures in accordance with the invention.

Table II

Fiber Loading at Maximum Solid Content of Various Fiber-Sphere Systems

| R | | L/D 3.91 | 7.31 | 15.51 | 24.49 | 37.10 |
|---|---|---|---|---|---|---|
| 0.11 | % Solids | 74.6 | 73.0 | 67.6 | 61.5 | 61.5 |
| | % Fiber Loading | 60.0 | 40.0 | 30.0 | 0.0 | 0.0 |
| 0.45 | % Solids | 67.1 | 68.0 | 63.7 | 61.5 | 61.5 |
| | % Fiber Loading | 50.0 | 45.0 | 30.0 | 0.0 | 0.0 |
| 0.94 | % Solids | 61.5 | 61.5 | 61.5 | 61.5 | 61.5 |
| | % Fiber Loading | 0.0 | 0.0 | 0.0 | 0.0 | 0.0 |
| 1.95 | % Solids | 61.5 | 61.5 | 61.5 | 61.5 | 61.5 |
| | % Fiber Loading | 0.0 | 0.0 | 0.0 | 0.0 | 0.0 |
| 3.71 | % Solids | 64.5 | 61.7 | 61.5 | 61.5 | 61.5 |
| | % Fiber Loading | 30.0 | 8.0 | 0.0 | 0.0 | 0.0 |
| | % Solids | 71.0 | 65.0 | 61.5 | 61.5 | 61.5 |

Table II-continued

Fiber Loading at Maximum Solid Content of Various Fiber-Sphere Systems

| R | | L/D 3.91 | 7.31 | 15.51 | 24.49 | 37.10 |
|---|---|---|---|---|---|---|
| 6.96 | | | | | | |
| | % Fiber Loading | 30.0 | 22.0 | 0.0 | 0.0 | 0.0 |
| | % Solids | 75.8 | 73.5 | 63.7 | 61.7 | 61.5 |
| 14.30 | | | | | | |
| | % Fiber Loading | 31.0 | 25.0 | 8.5 | 3.5 | 0.0 |
| | % Solids | 78.1 | 75.1 | 64.9 | 62.5 | 61.5 |
| 17.40 | | | | | | |
| | % Fiber Loading | 33.0 | 26.0 | 12.0 | 4.0 | 0.0 |
| | % Solids | 84.7 | 80.6 | 73.5 | 69.5 | 68.0 |
| * | | | | | | |
| | % Fiber Loading | 27.5 | 24.0 | 16.5 | 11.3 | 9.6 |

*Theoretical Values R=0 or R=∞

While the invention has been described with reference to certain embodiments thereof, it will be understood that certain changes and modifications may be made which are within the skill of the art, and within the spirit and scope of the invention. It is intended, therefore, to be limited only by the appended claims.

What is claimed is:

1. A fiber and sphere reinforced plastic article of manufacture comprising:
   a resin matrix material as binder; and,
   a mixture of glass fiber and glass bead sphere reinforcing materials, said fiber and sphere materials being present in a maximum packing condition thereby providing substantially low voids between said fibers and spheres in said article, said fibers having a definite length to diameter ratio ranging from 1/1 to 100/1, said fiber loading being between 0 and 100% in said mixture of fiber and spheres, and the ratio of the diameter of the spheres to that of the fibers being selected from values between 5 and 100 and between 0.1 and 0.01.

2. An article according to claim 1 wherein the length to diameter ratio of said fibers is between 1/1 to 50/1, the fiber loading is between 0 and 60%, and wherein the ratio of the diameter of the spheres to that of the fibers is greater than 5 and up to 100.

3. An article according to claim 1 wherein the fiber loading is between 10 and 100%.

4. An article according to claim 1 wherein the length to diameter ratio of the fibers is 40 or greater, the fiber loading is between 10 and 100% and the ratio of the diameter of the spheres to the diameter of the fiber is about 0.1.

5. An article according to claim 1 wherein the length to diameter ratio of the fibers ranges from 2/1 to 19/1, the fiber is between 0 to 20%, and the ratio of the spheres to the ratio of the fiber is about 20.

* * * * *